United States Patent [19]

Lifferth

[11] 4,050,700

[45] Sept. 27, 1977

[54] SEAL HAVING FLUENT PACKING MATERIAL

[76] Inventor: Henry R. Lifferth, P.O. Box 57, Fortine, Mont. 59918

[21] Appl. No.: 619,698

[22] Filed: Oct. 6, 1975

[51] Int. Cl.² ............................................. F16J 15/10
[52] U.S. Cl. .............................. 277/72 FM; 220/81 R
[58] Field of Search ................................... 277/17–21, 277/56, 67, 72, 75, 72 FM; 220/81 R

[56] References Cited

U.S. PATENT DOCUMENTS

| 1,187,212 | 6/1916 | Westinghouse | 277/56 |
| 2,141,259 | 12/1938 | Whittaker | 277/56 |
| 2,266,407 | 12/1941 | Bruestle | 277/67 |
| 2,740,647 | 4/1956 | Van Pelt | 277/56 |
| 2,891,808 | 6/1959 | Richardson | 277/67 |
| 3,465,425 | 9/1969 | Leidenfrost | 277/56 |

Primary Examiner—Robert I. Smith
Attorney, Agent, or Firm—B. Deon Criddle

[57] ABSTRACT

A seal made of one or more formed sealant receiving grooves, a fitting connected into the groove or grooves to allow sealant to be injected therethrough and a sealant material that can be injected through the fitting into the groove or grooves and that will retain its fluid characteristics while remaining in its assigned position.

1 Claim, 8 Drawing Figures

SEAL HAVING FLUENT PACKING MATERIAL

BRIEF DESCRIPTION OF THE INVENTION

1. Field of the Invention

This invention relates to means for providing a positive seal between parts and to seals and gaskets that can be readily replaced.

2. Prior Art

It has long been connom to use gaskets or seals between parts that must be sealed to prevent the escape of fluids, gases or other materials between the parts. In the past, such seals or gaskets have commonly been made of cork, rubber, aluminum or other suitable solid material that will conform to the irregular surfaces of the parts and that will close off all spaces between the parts. While these commonly used gaskets and seals have been effective, they have not been entirely satisfactory. They do not always make an effective seal and they are almost always difficult to replace since they require the parts to be entirely separated, removal of the old gasket, scraping and cleaning of the parts to insure good fit of a replacement gasket, proper positioning of the new gasket and reassembly of the parts.

SUMMARY OF THE INVENTION

Principal objects of the present invention are to provide a seal means that will effect a positive seal between parts and that can be quickly and easily replaced, if desired, even without separating the parts that are to be sealed.

Principal features of the invention include a sealing groove in at least one of a pair of parts that are to be mated with a seal between them, the sealing groove extending fully around or between an area to be sealed. It will become apparent that more than one such groove can be provided in the part and that a plurality of matched grooves can be provided in the mating parts. Zirk-type fittings, or other suitable fittings are provided in passageways interconnecting with the sealing groove to allow a sealant material to be forced into the sealing passage after the parts to be sealed are mated together. The sealant material used is dependent upon the nature of the material to be held against leakage and the temperatures and pressures involved. Typical sealants used include grease, wax, liquid plastic, liquid rubber, paste, asbestos, liquid teflon and liquid nylon. Other materials, of proper viscosity, may be used for particular purposes.

Other objects and features of the invention will become apparent from the following detailed description, taken together with the accompanying drawings.

THE DRAWINGS

In the Drawings:

FIG. 1 is a top plan view of two mated parts, with a seal of the invention therebetween;

FIG. 2, a vertical section taken on the line 2—2 of FIG. 1;

FIG. 3, a top plan view of the lowermost of the mated parts as shown in FIG. 1;

FIG. 4, a perspective view of a split cylinder with the cylinder halves clamped together and end plates thereon, with the seal of the invention between assembled components;

FIG. 5, a horizontal sectional view, taken on the line 5—5 of FIG. 4;

FIG. 6, a vertical section, taken on the line 6—6 of FIG. 4;

FIG. 7, a fragmentary perspective view of one of he cylinder halves shown in FIG. 4; and FIG. 8, a vertical, longitudinal section taken through two interconnected lengths of pipe, wherein the sealing means of the invention is used.

DETAILED DESCRIPTION

Figure 1:
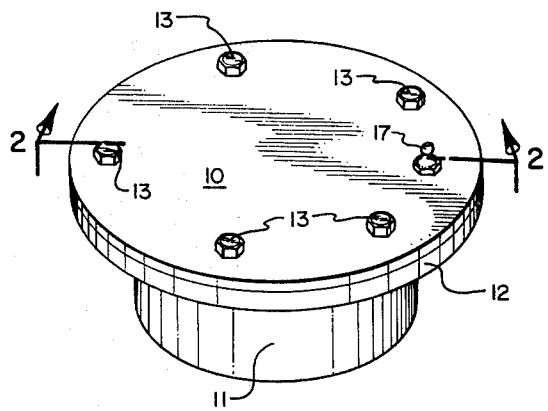
Figure 2:
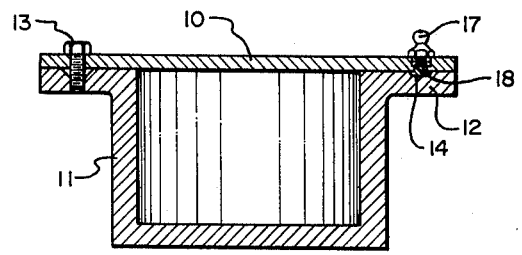
Figure 3:
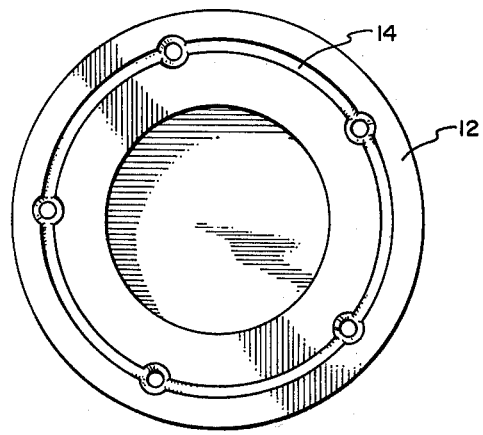

Referring now to the drawings:

In the illustrated preferred embodiment of FIGS. 1-3, the seal of the invention is particularly useful in providing a seal between two mating parts, such as for example, a lid 10 and a container 11 having a flange 12 on which the lid is to be bolted. Bolts 13 extend through holes provided therefor in the lid and are threaded into trapped holes provided therefore in the flange. A groove 14 is provided in the flange.

The groove 14 interconnects the bolt holes through the flange, and each hole is chamfered in the groove to insure passage of sealant around the bolt inserted therethrough.

A bore 16 is provided through the lid and into groove 14 and a Zirk fitting 17 having a check valve therein is threaded into the bore.

After the lid is mounted on the flange and the bolts 13 are tightly secured a sealant 18, which may be grease, wax, liquid plastic, liquid rubber, paste and asbestos or other such flowable sealant material having desired characteristics is injected under pressure, through the Zirk fitting and the check valve therein and into the groove 14 until the groove is full of sealant. The sealant is selected to be flowable into the groove 14, but is of a material that will then harden to the extent necessary to keep from being forced out of the grooves and between the matching faces of the lid flanges. If necessary, one or more other ports (not shown) can be formed through lid 10 so as to intercept groove 14 at the point most remote from Zirk fitting 17 and a plug can be threaded into the added port, or ports. Then, if air is trapped in the grooves 14, the plug can be removed to allow the air to bleed out.

Figure 4:
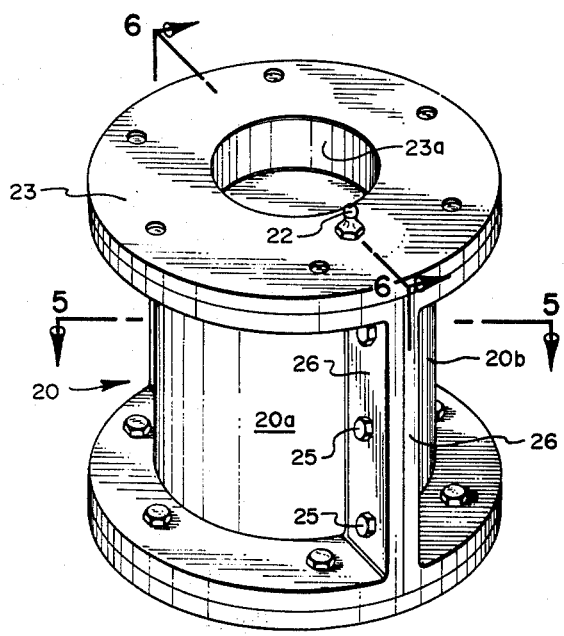
Figure 5:
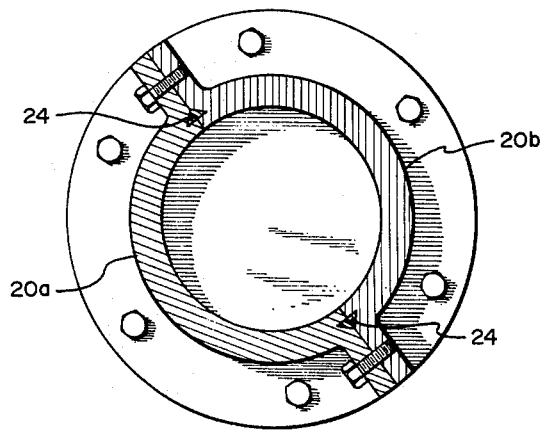
Figure 6:
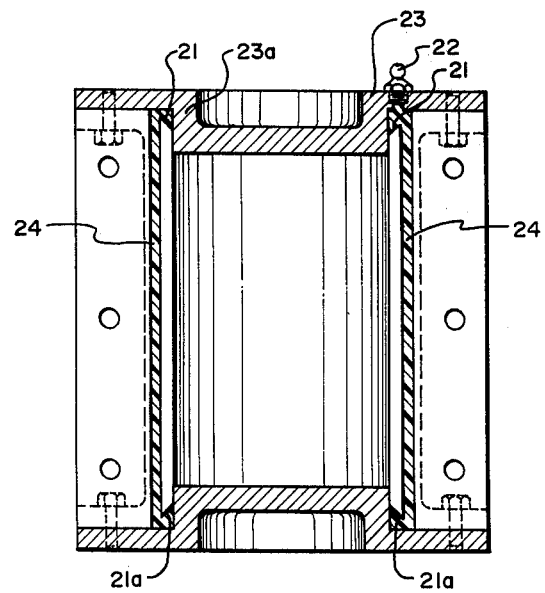
Figure 7:
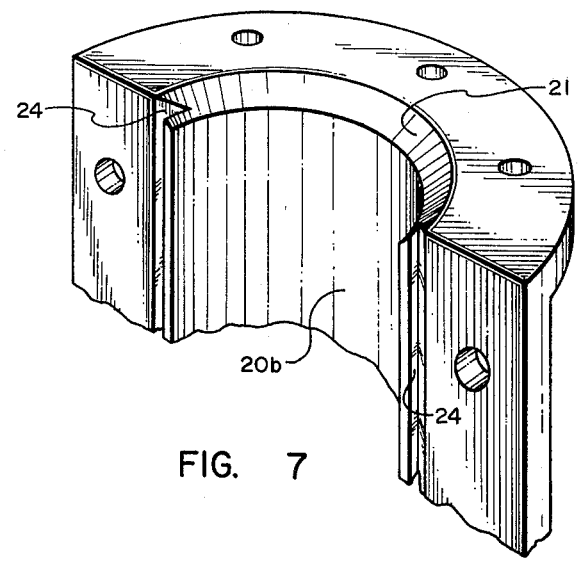

As shown best in FIGS. 4-6, the seal of the invention is also adapted to other configurations of connected members. Thus, as shown, for right angle connections the abutting edge of one member, here shown as a cylinder 20, formed from interconnected cylinder halves 20a and 20b, can be chamfered top and bottom as shown at 21 and 21a (FIGS. 6 and 7) and the chamfered portion 21 is arranged to receive sealant fluid from a Zirk-type fitting 22 extending through the other member, here shown as lid 23. The sealant thus provides a gasket extending fully around the upper end of cylinder 20, engaging both a depending inner portion 23a of lid 23 and an outwardly extending portion 23b of the lid, and preventing loss of any material within the cylinder between the cylinder end and the lid. The cylinder halves have V-shaped grooves 24 extending lengthwise at each side thereof and intercepting the chamfered portions 21 and 21a. Thus, when the halves are clamped together by bolts 25 threaded through flanges 26 of the halves sealant will fill the chamfered portion 21, the grooves 24 and the chamfered portion 21a.

Figure 8:
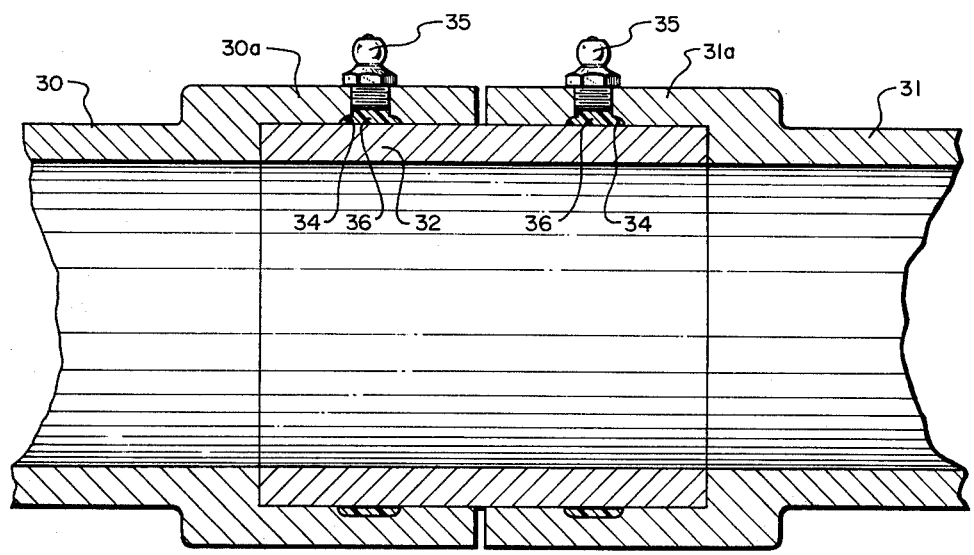

The seal of the invention can also be readily used in place of conventional, more expensive, expansion seals. For example, as best shown in FIG. 8, a pair of conduits 30 and 31, having enlarged bell ends 30a and 31a respectively can be coupled together by a length of straight conduit 32 that telescopes into the enlarged bell ends 30a and 31a and such that the inner surfaces of the conduits 30, 31 and 32 form a substantially smooth and continuous conduit inner wall. An encircling groove 34 is provided inside each of the enlarged ends 30a and 31a and a Zirk-type fitting 35 is threaded through each enlarged end and into a groove 34. In use, the conduit 30 and 31 are interconnected by the conduit 32 and sealant 36 is injected through the Zirk-type fitings 35 to fill the grooves 34. The sealant totally encircles the conduit 32 and will provide seals between the conduits 30 and 31 and conduit 32 even if the enlarged ends 30a and 31a are moved with respect to the conduit 32.

While the sealant has been herein disclosed as being applied through Zirk-type fittings, it will be apparent that other types and shapes of fittings can be used.

Although preferred forms of my invention have been herein disclosed, it is to be understood that the present disclosure is made by way of example and that variations are possible without departing from the subject matter coming within the scope of the following claims, which subject matter I regard as my invention.

I claim:

1. A seal adapted to prevent flow between interconnected members, comprising
   a pair of abutting members in face to face relationship;
   a third member extending transversely to the junction between the pair of members and abutting said members;
   a first groove extending fully between the pair of abutting members and another groove formed by a chamfered edge of one of said abutting members, said other groove being in communication with the first groove and in communication with the third member;
   a fitting adapted to receive a liquid sealant under pressure; means interconnecting the fitting and one of said grooves; and
   a liquid sealant injected through the fitting and filling said interconnected grooves.

* * * * *